10-14-75 OR 3,913,034

SR

United States Patent [19]

Thomas

[11] 3,913,034

[45] Oct. 14, 1975

[54] PULSED MICROWAVE OSCILLATOR

[75] Inventor: Edward Lee Thomas, Owensboro, Ky.

[73] Assignee: General Electric Company, Owensboro, Ky.

[22] Filed: May 7, 1974

[21] Appl. No.: 467,642

Related U.S. Application Data

[63] Continuation of Ser. No. 388,451, Aug. 15, 1973.

[52] U.S. Cl. .............................. 331/98
[51] Int. Cl.[2] .............................. H03B 5/18
[58] Field of Search .............................. 331/96–98, 331/101

[56] References Cited

UNITED STATES PATENTS

| | | | |
|---|---|---|---|
| 2,421,784 | 6/1947 | Haeseler et al. | 331/98 |
| 2,436,398 | 2/1948 | Morton | 331/101 |
| 2,681,997 | 6/1954 | Haeff et al. | 331/98 |
| 3,249,890 | 5/1966 | Beaty | 331/98 |
| 3,577,100 | 5/1971 | Askew | 331/101 |
| 3,644,843 | 2/1972 | Sigmon | 331/101 |
| 3,704,429 | 11/1972 | Sigmon | 331/101 |
| 3,748,528 | 7/1973 | Cronson | 331/101 |

*Primary Examiner*—John Kominski
*Attorney, Agent, or Firm*—Dennis A. Dearing

[57] ABSTRACT

A high-frequency coaxial cavity oscillator having substantially reduced input capacitance for operation in a pulsed mode. The oscillator is constructed with an inner conductor divided into two sections and a lumped constant RF choke connecting the inner conductor and a charge carrier device to a pulse source.

6 Claims, 1 Drawing Figure

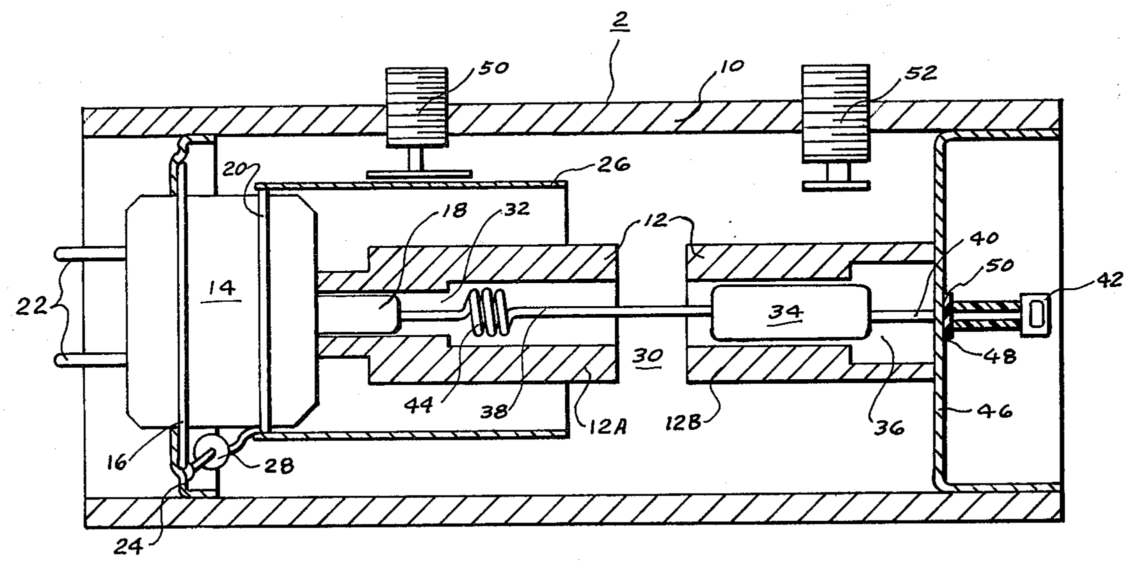
2
50
10
52
20
26
18
32
12
40
50
42
22
14
34
30
48
46
44
38
12A
12B
36
16
28
24

PULSED MICROWAVE OSCILLATOR

This is a continuation, of application Ser. No. 388,451, filed Aug. 15, 1973.

BACKGROUND OF THE INVENTION

This invention relates to high frequency oscillators and, more particularly, to cavity oscillators of the reentrant type.

Tunable high frequency oscillators such as, for example, microwave cavity oscillators, are conventionally constructed with an outer metallic shell electrically connected to a first electrode of a controlled charge carrier device, such as a high frequency tube, and an inner conductor coaxially located within the outer metallic shell and electrically connected to a second electrode of the charge carrier device. The outer metallic shell and the inner conductor form a section of a coaxial line. Such oscillators also have a tubular conducting member connected to a control electrode of the charge carrier device. The tubular conducting member, commonly referred to as a grid sleeve, extends coaxially between the outer metallic shell and inner conductor. To produce oscillation and radio frequency (RF) energy, it is necessary to apply a relatively high direct voltage between the first and second electrodes of the charge carrier device. RF energy is coupled to a load by means of a probe extending into the cavity.

One problem with microwave cavity oscillators is that RF energy tends to follow along the inner conductor to the outside of the cavity where the RF energy is lost as radiation. This loss reduces the overall efficiency of the cavity oscillator and thus the power available to be conducted to a load, and such loss may adversely affect oscillation of the cavity. Prior art attempts at solutions to this problem have included using bypass capacitors and slidable quarter-wave choke joints to present a high-frequency short-circuit termination to the RF energy at the point of entry of the inner conductor into the cavity. Both of these solutions considerably increase the input capacitance of the cavity. This increased input capacitance, although not necessarily significant when the cavity is operated in a continuous wave mode, becomes a problem when the cavity is operated in a pulsed mode since the input capacitance affects the rise time of an input pulse and may distort the input pulse waveform.

One prior art attempt at a solution for materially reducing the input capacitance of a microwave cavity oscillator, while short-circuit terminating the cavity, has been to replace the prior art direct connected continuous inner conductor (anode line) with an anode line assembly which includes inner and outer coaxial line sections, telescopically assembled. Surrounding this anode line assembly with another tubular sleeve, insulated from the anode line and electrically connected to an end shield closing the cavity allows RF energy to be reasonably contained within the oscillator cavity while a reduced input capacitance is presented to a pulse source. However, this assembly and sleeve arrangement requires numerous parts which must be accurately located within the cavity. Furthermore, since the input capacitance is directly related to the surface area within the cavity which must be charged by an external power source and since the surface area of the sleeve—which must be charged by an applied input pulse—is relatively large, the input capacitance reflected to the pulse source is relatively large.

SUMMARY OF THE INVENTION

It is therefore an object of the invention to provide an improved high frequency cavity oscillator which effectively minimizes undesired RF radiation from within the oscillator cavity.

Another object of the invention is to provide an improved high frequency cavity oscillator which has a low input capacitance and therefore reduces the effect on the rise time of an input pulse when the high frequency cavity oscillator is operated in a pulsed mode.

It is a further object of the invention to provide an improved high frequency cavity oscillator having a low input capacitance and requiring a minimum number of component parts.

To achieve these and other objects, in one form of this invention, there is shown a high-frequency cavity oscillator comprising an outer elongated hollow conductor and a high-frequency (HF) tube having anode, cathode and grid elements with the tube disposed within one end of the outer conductor. The cathode is electrically connected to the outer conductor. A two-section inner conductor or anode line is coaxially disposed within the outer conductor with one section electrically connected at one end to the anode of the HF tube. The two sections of the anode line are axially aligned in a spaced relationship to form a gap between the two sections. A grid sleeve electrically connected to the grid of the tube is coaxially disposed between the inner and outer conductors and extends axially along a portion of the inner conductor. The inner and outer conductors in combination with the grid sleeve form grid-cathode and plate-grid resonant cavities within the oscillator. A conducting disc having a central aperture closes the end of the cavity opposite the HF tube. The disc is electrically connected to the outer conductor and to the other section of the inner conductor. This section of the inner conductor is thus short-circuit terminated. A lumped constant RF choke is disposed within a bore of the inner conductor and is electrically connected between the anode of the tube and an external power source.

This arrangement provides a high-frequency cavity oscillator in which said one section of the inner conductor is isolated from the high voltage applied to the anode of the HF tube. However, because the gap between the two sections of the inner conductor is located at approximately a quarter-wave length from the short-circuit terminated end of the inner conductor, it is at a high impedance point of the coaxial line formed by the inner and outer conductors. The gap therefore appears as a continuous conductor to the RF energy within the cavity and has virtually no effect on the cavity oscillations. Since the inner conductor itself is short-circuited, the primary capacitance to be charged by an applied voltage is the cross-sectional surface area of the inner conductor at the gap between the two sections. Since the input capacitance is directly related to the surface area to be charged, the input capacitance becomes extremely small.

BRIEF DESCRIPTION OF THE DRAWINGS

The invention will be further understood by referring to the following description and the accompanying drawing which is a longitudinal cross section of an embodiment of the invention.

DETAILED DESCRIPTION OF THE INVENTION

Referring now to the drawing, a high-frequency oscillator, generally indicated at 2, comprises a section of coaxial transmission line having a tubular outer conductor 10 and a tubular inner conductor indicated generally at 12. The oscillator further comprises a high-frequency, controlled charge carrier device having electron source means, electron output means and electron control means. In the particular form shown, the controlled charge carrier device is a metal-ceramic planar tube 14 having cathode, anode and grid electrodes which are respectively connected to a cathode ring 16, an anode cap 18, and a grid ring 20. The cathode, as is well known, is indirectly heated from a source (not shown) connectable to heater pins 22. While the high-frequency cavity oscillator is illustrated as powered by a tube, it should be understood that other controlled charge carrier devices such as solid state devices can be used.

The tube 14 is mounted in one end of outer conductor 10 by a retaining ring 24 which is attached to the inner wall of outer conductor 10. Ring 24 is electrically connected to and may be bonded to cathode ring 16 for providing electrical connection between the cathode of tube 14 and outer conductor 10.

A grid sleeve 26 is mounted on grid ring 20, in a manner well known in the art, to form a hollow conductor coaxially disposed within outer conductor 10. A resistor 28 interconnects cathode ring 16 and grid ring 20 and provides a DC return path to the grid.

Inner conductor 12 is a two-section tubular anode line comprising a first section 12A and a second section 12B. A gap 30 electrically isolates the two sections with respect to DC and video frequency components of the input signal. The anode of tube 14 is connected to inner conductor 12 by pressing anode cap 18 into a bore 32 in section 12A, or by connecting the anode cap and inner conductor in any other manner well known in the art.

A lumped constant RF choke 34 is disposed in an inner bore 36 of section 12B. Leads 38 and 40 interconnect choke 34 between anode cap 18 and an input terminal 42. Inductance additional to that provided by RF choke 34 may be added by forming turns 44 in lead 38.

A conductive disc 46 is fitted into and electrically connected to one end of outer conductor 10. Section 12B is firmly connected to disc 46 thereby short-circuiting section 12B to outer conductor 10. An aperture 48 is formed in disc 46 centrally of tubular section 12B for passage of lead 40 out to input terminal 42. Lead 40 is insulated from conductive disc 46 by an insulator 50.

A capacitive coupled RF probe assembly 50 is disposed adjacent grid sleeve 26 for conducting RF power out of the cavity.

The two sections of inner conductor 12 are formed such that at the operating frequency of the oscillator section 12B is approximately equal to a quarter-wave length of the electrical energy and section 12A is approximately equal to a half-wave length of the electrical energy. The short-circuit termination of section 12B at disc 46 is a low impedance which is reflected as a high impedance at the gap 30 intermediate sections 12A and 12B.

If desired, suitable tuning means such as that generally indicated at 52 may be incorporated to facilitate exact frequency tuning of the cavity.

In operation, oscillation is started and RF energy is produced by applying a potential between input terminal 42 and outer conductor 10. The impedance of RF choke 34 effectively prevents the RF energy within the cavity from following along leads 38 and 40 and radiating out of the cavity. Furthermore, since inner conductor 12 is short-circuit terminated, the RF energy is prevented from following along the inner conductor and radiating out of the cavity. The input capacitance which the energizing source sees in addition to the anode to grid capacitance of the tube is primarily the capacitance formed by the adjacent ends of inner conductor 12 across gap 30. A minute amount of input capacitance is additionally present because of the distributed capacitance of RF choke 34. Since the input capacitance is determined by the cross-sectional area of inner conductor 12 at gap 30, this capacitance can be made extremely low. Tests have shown that the average input capacitance achieved with this configuration can be as little as one-third of that achieved with one form of the prior art utilizing a continuous anode line construction. Location of the gap 30 at approximately the quarter-wave point on inner conductor 12, measured from disc 46, causes the capacitive reactance of gap 30 to be low compared to the reflected line impedance; hence, the inner conductor 12 appears as a continuous conductor to the RF energy while causing a high impedance to a DC or to a pulse voltage, composed of relatively low frequency components, between sections 12A and 12B.

When operated in the pulsed mode, the cavity assembly has been found to have substantially no effect on the shape of the waveform of driving pulses because of the low input capacitance associated with the small cross-sectional surface area of inner conductor 12. Therefore, the rise time of the leading edge of a driving pulse can be made very fast and the leading edge of the driving pulse will essentially not be changed by the cavity oscillator. For example, the rise time of the pulses may be 10% to 20% less than that required for one form of the prior art utilizing a continuous anode line construction. The cavity oscillator is therefore capable of producing an RF pulse having a sharply defined leading edge and a very fast rise time.

Having thus described the invention, I desire that the claims herein be given as broad an interpretation as is consistent with the spirit and scope of the invention.

What is claimed as new and desired to be secured by Letters Patent of the United States is:

1. A high-frequency, pulsed mode, cavity oscillator comprising:

a. a first tubular conductor member;

b. a high-frequency triode tube disposed in said first member and having an anode, cathode and grid;

c. a second tubular conductor member coaxially disposed within said first member, said second member further comprising axially aligned first and second sections, said first section being electrically connected to said anode and having a portion axially spaced from said tube a first distance, said second section having a portion axially spaced from said device a second distance greater than said first distance, said portions arranged in an axially spaced, mutually opposed relationship such that a gap is formed therebetween, said second member forming with said first member an oscillator cavity resonant at a predetermined operating frequency; and said gap positioned at a high impedance point of the cavity at the operating frequency;

d. a third tubular conductor member coaxially disposed between said first and second members and electrically connected to said grid, said third member forming grid-cathode and plate-grid resonant cavities, respectively, with said first and second members;

e. a conductive means electrically connected between said first member and said second section for short-circuit terminating said oscillator cavity;

f. an input terminal insulated from said conductive means and adapted for connection to a pulsed input source; and g. resistance means disposed within said second member and electrically connected between said input terminal and said anode.

2. The oscillator of claim 1 further comprising an RF choke disposed in said second member and connected in circuit with said tube, said resistance means and said input terminal.

3. The oscillator of claim 2 wherein said RF choke is a lumped constant choke and is disposed in said second section of said second member.

4. The oscillator of claim 1 wherein the length of said second section of said second tubular conducting member is approximately equal, electrically, to a quarter-wave length at the operating frequency of the oscillator.

5. The oscillator of claim 4 wherein tuning means is provided for adjusting the operating frequency of the oscillator.

6. The oscillator of claim 5 and including a plurality of turns formed in a lead wire of said RF choke to provide additional RF isolation.

* * * * *